Patented July 3, 1951

2,558,854

UNITED STATES PATENT OFFICE 2,558,854

CACAO PROCESS AND PRODUCT

Norman W. Kempf, Auburndale, Mass., and Harvey K. Murer, Summit, N. J., assignors to General Foods Corporation, New York, N. Y., a corporation of Delaware No Drawing. Application June 22, 1948, Serial No. 34,558

24 Claims. (Cl. 99—23)

The present invention relates to a process of curing raw cacao and to improved products produced thereby including the cured cacao itself and also the subsequently roasted cacao and the chocolate and cocoa prepared therefrom.

Chocolate and cocoa products are derived from the fruit of *Theobroma cacao* which consists of pods containing numerous seeds embedded in a mass of pulpy mucilaginous material. The seeds in turn consist of two curiously folded cotyledons and a radicle enclosed within a fleshy envelope of fibrous and mucilaginous material. The whole seeds in raw or dried form are commonly referred to as cacao beans and it is in this sense that the term "beans" is used herein. Drying of the raw beans converts the fleshy envelope into a dense hard sheath designated in the trade as "shell." The portion within the envelope or shell from which chocolate and cocoa products of commerce are produced after suitable processing is for brevity and ease of description referred to hereinafter as the "kernel." Due to their curiously folded nature, dried kernels tend to separate into segments after removal of the shells and the term "kernel" is used herein to designate both the intact and the segmented forms of the kernels. In contradistinction to kernels, the term "nibs" as used herein and as established by trade acceptance designates the product resulting from roasting the processed kernels.

The traditional processing of raw cacao beans to prepare them for the manufacture of chocolate and cocoa products involves fermentation which produces characteristic changes in the color, flavor and aroma of the beans by which their quality and market value are judged according to the long-established practice of the industry. When the raw beans are cut to judge color, they vary from white to purple, are somewhat astringent, and have little or no chocolate color, flavor or aroma. The results of fermentation include the elimination of astringency and the development of changes in the beans such that, upon subsequent roasting and grinding, chocolate color, flavor and aroma are produced in the resulting chocolate liquor. In general fermentation practice, a mass of raw beans with adhering pulp are simply piled or heaped and allowed to ferment for a suitable length of time. Generally speaking, the sugars of the pulp are converted into alcohol by yeasts and the alcohol is converted into acetic and other acids by acetic acid bacteria. The pulp gradually loses its glutinous nature and loosens from the beans and much of it drains from the mass as "sweatings," leaving a thin coat of paste on the beans which may be washed off before drying but more often is simply dried on the beans.

The following table is given as an example of fermentation temperatures and pH values occurring in the tropics (Panama):

| Time, Hrs. | Temperature, °C. | pH of Sweatings | pH of Pulp | pH of Kernels |
|---|---|---|---|---|
| 18 | 32 | 5.2 | 3.6 | 6.6 |
| 48 | 48 | 4.8 | 4.2 | 5.3 |
| 72 | 48 | 4.8 | 4.8 | 5.3 |
| 96 | 46 | 4.6 | 5.7 | 5.5 |
| 120 | 42 | 4.2 | 6.4 | 5.6 |

Because of the slow rise in temperature and the low maximum temperature attained, two to seven days of fermentation are necessary to bring about the desired changes in the beans. During this fermentation the acids generated gradually diffuse into the kernels, as shown by the fact that the pH of the latter is almost neutral at the start and thereafter decreases while the pH of the pulp steadily rises. In the later stages of fermentation the pH of the kernels rises again until it reaches equilibrium with the gradually rising pH of the pulp. This rise in pH is accompanied by the development of putrefactive organisms which cause objectionable flavor changes. Consequently it is customary to end the fermentation process when equilibrium is reached, which is judged in practice by a swelling or turgidity of the beans, a tightening and darkening of their outer pulpy layers, and contraction of the latter around the beans.

Such fermentation procedures continue to be used in the art in spite of the following well known and serious problems, a real and practical solution of which is provided for the first time by the present invention:

1. Bacteria counts range in the millions per unit grams of the beans. Roasting and processing of the roasted nibs in the chocolate factory reduces the extent of bacterial contamination, but leaves significant numbers of spore-forming thermophilic bacteria in the finished chocolate.

Because of their resistance to pasteurization, these remaining organisms present serious difficulties as regards the use of the chocolate in milk, ice-cream and other dairy products.

2. The difficulty of controlling fermentation effects and the varying susceptibility of the many varieties of beans to fermentation cause extreme variation in the quality of fermented beans. The beans often acquire slate and other off-colors and peculiar off-flavors variously characterized as hammy, woody, earthy, cheesey, malty, etc., all more or less unavoidable in fermentation procedures. Such variations in quality necessitate different roasting treatments in the chocolate factory, and even then there are major color and flavor differences in the chocolate liquors so that the blending of these liquors has become an established practice in the chocolate industry.

3. Much of the natural astringency of the raw beans disappears during fermentation, but at the same time the beans acquire a characteristic sourness due to the acids formed. These acids are sufficiently volatile that they can be removed effectively by the use of very high roasting temperatures, but at the expense of impaired flavor and aroma due to loss of the fugitive aromas developed by roasting. In general, therefore, roasting is carried out at moderate temperatures so as to retain as much chocolate aroma as possible, and the ground liquors are later subjected to special processing such as conching to drive off as much as possible of the acids and other substances contributing to off-flavor. Nevertheless these liquors retain a peculiar bitterness or acidity which is more or less pronounced depending on varieties and methods of fermentation.

4. Very large losses are often incurred in the markets by the molding of the beans. Such losses occur chiefly as the result of badly conducted processing of the beans, but even well conducted procedures cannot entirely prevent the inoculation of the beans which are thus susceptible to molding during storage or shipment and must be carefully sheltered and protected against dampness to minimize spoilage.

5. The organic acids developed in the beans during fermentation are present in sufficient proportion to attack cement floors and walls during storage, and the acid vapors given off during roasting are known to corrode metal flues and other parts of the roasting apparatus.

Various proposals have been made in the past to eliminate the above undesirable concomitants of fermentation. Thus expedients have been suggested such as separation of the outer adhering pulp from the raw beans, special handling of the beans to avoid contamination with yeasts and bacteria insofar as possible, and the use of temperatures and other conditions unfavorable to the growth of yeasts and bacteria. However, all such measures which at best could only minimize adverse fermentation effects have proved unsatisfactory in practice.

Other proposals have been made which were of a different nature in that they suggested the elimination of fermentation. These proposals were based on the premise that once the beans were devitalized, color and flavor changes equivalent to those produced by good fermentation procedures would follow as a natural consequence of the activity of their contained enzymes. To effect devitalization without destroying these enzymes, such diverse methods were suggested as treatment with alcohol or acid, freezing, mechanical grinding, and heating to lethal temperatures. Procedures of this nature were proposed at least as early as 1912 by Fickendey (H. Hamel Smith's Fermentation of Cacao, London, 1913) and subsequently by various other workers such as Knapp (J. Soc. Chem. and Ind., vol. 43, 1924); Stevens (Bull. Dept. Agri., Trinidad, vol 21, 1925); Hardy (Trop. Agri., Trinidad, vol. 3, 1926); Preuss (Tropenpflanzer, vol. 29, 1926); McLaughlin (U. S. Patent No. 1,575,372); Zeller (British Patent No. 304,181); Muller (British Patent No. 329,015), etc. In most if not all cases, the enzymic reactions produced color, flavor and aroma effects in the beans that appeared to be equivalent to those obtained by well conducted fermentation. Stevens, for example, reported that his treated beans were superior to fermented beans and were priced at a much higher figure by cacao buyers.

However, the above proposals never passed beyond the stage of experiment and discussion because the results obtained were not satisfactory. In 1937, Knapp reviewed them all in his Cacao Fermentation (London, 1937) and pointed out that when the treated beans were subsequently roasted and ground into chocolate liquor, the latter did not possess satisfactory chocolate flavor and aroma. As late as September, 1947, the suggestion of using the enzyme content of the beans was still in the discussion stage (apart from the present invention), and in fact was mentioned merely as "one possible mode of approach" to avoiding the "obvious defects" of fermentation by Humphries before the international cocoa conference of the Cocoa, Chocolate and Confectionery Alliance Limited.

One of the objects of the invention is to cure raw cacao by a selective enzymic treatment and substantially without fermentation.

A further object is to reduce greatly the time and labor required to prepare cacao beans according to present fermentation practice.

A still further object is to produce nonfermented, cured cacao capable of being processed into chocolate liquor possessing full chocolate flavor, aroma and color.

Another object is to produce cured cacao free of those undesirable properties of fermented beans, on the one hand, and of prior experimentally treated beans, on the other hand, which become manifest in and deleteriously affect the quality of the eventual chocolate liquor.

Still another object is to product cured cacao which is substantially free from natural astringency, acids of fermentation and off-colors or flavors, but is capable of developing when roasted and ground the full chocolate color and flavor characteristics desired in the liquor.

Still another object is to produce roasted cacao having no off-colors or flavors and further characterized by absence of either fermentation acids or objectionable acidity developed by roasting.

Further objects are to produce high quality chocolate liquors from any source or variety of cacao beans and to produce from a given source or variety liquors that are of uniform quality from the standpoint of color and flavor characteristics.

A still further object is to minimize the amount of conching required to produce high quality chocolate liquors.

Another object is to produce a uniform cured cacao of any given type which can be roasted under standard conditions.

Yet another object is the substantial elimination of problems of molding during storage, bacterial contamination of the eventual chocolate products, etc.

These and other objects of the invention are set forth more fully hereinafter.

In accordance with the present invention, raw cacao is subjected to a treatment the fundamental objective of which is the promotion and control of a selective enzymic activity to bring about desired changes in the cacao without objectionable concomitants. This objective is achieved for the first time by the present invention through the establishment of precise conditions of operation. Maintenance of these conditions is effected through two general types of controls, namely, preparative controls applicable to the treatment of the raw cacao prior to curing (by which is meant the selective enzymic treatment mentioned above), and operational controls relating to curing itself. For convenience the latter will be discussed first.

Generally speaking, selective enzymic activity is brought about by subjecting the raw cacao to a controlled heat treatment in a well defined temperature range. The limiting values of the temperature range, which are set forth in detail hereinafter, are high enough to prevent the growth of organized ferments as well as to devitalize the beans quickly, thereby eliminating fermentation and germination effects. Also these values are such as to promote desired enzymic activity and at the same time to minimize undesirable enzymic reactions.

The enzymic reactions that may take place within the raw cacao are complex and difficult of explanation. However, it can be stated that they are of different types, some of which are desirable and some undesirable, and that they are greatly influenced by temperature conditions. For example, treatment at fermentation temperatures, but under aseptic conditions to exclude the effects of organized ferments, results in duplication of off-colors and off-flavors which so often develop in fermentation. Thus it appears that these changes are due to undesirable enzymic reactions, possibly of the reducing or hydrolyzing type or both. These undesirable reactions are favored at the relatively low temperatures of fermentation but above about 50° C. they are substantially inhibited and at 60° C. these enzymes are inactivated to a large extent, whereas desirable enzymes remain active at these temperatures. Moreover, some thermophilic types of bacteria remain active at relatively high temperatures, and some natural sugars remain in the beans even after removal of the pulp, etc., as described hereinafter. Hence if the beans are treated at temperatures below 50° C., the time required to effect the desired changes may permit enough fermentation to take place to cause objectionable increases in volatile acidity (fermentation acids) or in bacterial counts. These factors impose a lower limit of about 50° C. on the temperature to be maintained during curing.

On the other hand, the upper limit of curing temperatures suitable for the purposes of the present invention is about 65° C. The enzymic reactions responsible for the desired curing effects are accelerated as the temperature is increased, but at the same time the enzymes are inactivated with increasing rapidity. At temperatures substantially in excess of 65° C., the concentration of desirable enzyme is so low that effective curing action can not take place.

In some cases it may be desirable to heat the beans to 60°–65° C. for a short period for more complete inactivation of undesirable enzymes and pasteurization, and thereafter to complete curing at approximately the minimum temperature of 50° C. In other cases as with immature beans, it may be desirable to hold the beans at or near 50° C. for a period sufficient to effect their ripening and then to raise the temperature to 60°–65° C.

It should be understood that the temperatures mentioned above are to be maintained within the beans themselves, not merely in the surrounding heating zone.

Also the curing operation of the present invention is to be differentiated from mere drying at corresponding temperatures, since moisture must necessary be present in order for the curing reactions to proceed. The desirable reactions are retarded at relatively low moisture levels, and in order to complete curing within the maximum limits of curing time set forth below, it is necessary to maintain a minimum moisture level of 12–15% throughout curing. Higher moisture contents cause no difficulty and in fact expedite curing, but if there is danger of drying out the material below the aforesaid minimum, then additional moisture should be supplied in any suitable way as by humidifying the curing atmosphere, moistening the beans before or during curing, etc.

Within the aforesaid temperature limits of 50–65° C., curing of the row cacao to the proper point and not beyond entails a definite limitation of the time of treatment, after which the cacao should be dried rapidly to arrest curing. A main limiting factor is the development during curing at these temperatures of substances which give rise to objectionable acidity in the eventual chocolate liquor. These substances are not of an acid nature and are undetectable as acids during curing but become of an acid nature or lead to the formation of acids during roasting. The extent to which these precursors of acidity are formed during curing increases with time of curing, as shown by the following Examples 14–17. It will also be evident from these examples that the pH values of the liquors are not a true measure of their acid nature. Apparently the substances responsible for acidity are characterized by a low degree of dissociation, and buffering substances may be present as well. Nevertheless the presence of these acid substances in the liquor is apparent to the taste which is known to be influenced by titratable acidity as well as by pH. Furthermore these acids developed by roasting are evidently of low volatility inasmuch as such acidity persists even after prolonged conching.

The taste effect of these acid substances differs both from natural astringency and from the sourness caused by volatile fermentation acids, being a harsh, bitter after-taste which is not only objectionable per set but which also tends to mask the desired chocolate aroma and flavor. When the present curing process is carried to the extent that the cured beans approximate in apparent qualities those obtained by customary fermentation processes, the cured beans contain an excessive amount of such acid precursors. When the time of curing is limited to avoid such excessive development of acid precursors, the beans appear to be under-cured and of poor quality when judged by the usual standards applicable to fermented beans, but nevertheless we have found that the chocolate flavor and aroma developed upon roasting such beans is fully evident and liquors of excellent quality are obtained.

Since the extent of the curing period depends partly on the particular procedure followed preparatory to curing it is desirable to describe the permissible variations in preparatory procedure before setting forth specific time limits for curing.

The chief requisite of any preparatory procedure is to eliminate most and preferably as much as possible of the mucilaginous pulpy material stripped from the pods with the raw beans and both adhering to the beans and permeating their envelopes. These materials are highly acid and diffusion of these acids into the kernels would not only retard curing reactions but also cause objectionable acidity in the cured and roasted products. The removal of such materials preparatory to curing permits the initial almost neutral pH of the kernels to remain substantially unchanged, minimizing volatile acidity in the cured product and facilitating curing reactions. Also these materials if left on the beans substantially decrease the permeability of their surrounding envelopes and hinder the aeration of the kernels that is necessary for oxidative curing reactions. Further when the beans are dried the mucilaginous matter forms a relatively thick hard shell which may amount to as much as 14–17% of the dried product. Such shells prolong the drying operation unduly and may result in the continuance of enzymic reactions beyond the desired end point. Also loosening of the shells on the beans during roasting is incomplete, leading to imperfect separation of the shells by the usual cracking and winnowing operations.

Generally speaking, the removal of such mucilaginous material can be accomplished in two ways, either (a) By appropriate washing procedures or (b) By removing the shells and curing only the kernels.

Washing results in thinner more permeable shells and if done thoroughly reduces the shell content of the dry beans to as little as 4–5%. Thus the cured beans can be dried quickly without risk of over-curing, and furthermore the thin shells when dry are of the nature of thin, loose skins so that practically complete separation from the kernels can easily be effected. It is preferred to wash the beans promptly after their removal from the pods so that fermentation effects are substantially entirely eliminated. In case the pods are opened on the plantation, however, incipient fermentation of the pulp may set in while the beans and pulp are in transit to the washer. Washing removes this pulp and stops the fermentation reactions. After washing, immature or green beans can be held for substantial periods without fermentation to allow the beans to ripen before curing.

Washing can be carried out with either cold or hot water, but water at a temperature of 50° C. to 65° C. in the curing range is preferred in order to heat the beans rapidly to curing temperature. Thus growth of ferments is minimized and undesirable enzymes are quickly inhibited and have little if any chance to exercise their effects on the beans. Washing is best accomplished by rapid tumbling or other vigorous agitation of the beans under a water spray. The time required will of course depend on the efficiency of the washing procedure. Thorough washing under good conditions reduces the total weight of the beans as removed from the pod by approximately 20–30% and their shell content to about 4–5% on a dry basis. The wet beans contain about 45–50% moisture, somewhat less than before washing.

The removal of acid substances is indicated by average pH values of the wash water, the inflowing water being about 6.5, the initial effluent about 3.6 and the final effluent about 6.5. It will be understood that the pH of the wash water can be adjusted by suitable additions so as to facilitate the washing operation. The pH value of the whole beans and kernels can be determined by thoroughly macerating 20 gms. of wet material (or 10 gms. dry material and 200 ml. water) in a Waring Blendor, cooling the mixture to room temperature, and measuring its pH with a glass electrode. The pH of the whole washed beans will range from about 6.2 to 6.6, being very close to that of the kernels of the unwashed beans. These pH values do not change significantly through the curing and drying treatments, due to the absence of pulp acids and fermentation acids, and lie in a range favorable to the desired enzymic curing reactions. While washing of this extent is preferred, it will be understood that good results can be obtained with less thorough washing provided the greater part of the pulpy mucilaginous material is removed.

In one form of the process, therefore, the whole beans are first washed as described above and then cured, dried and roasted, the shells being removed either prior to or after roasting in the usual manner. These operations may be performed as a more or less continuous process. However, roasting may be delayed and the dried beans meanwhile held in storage or if desired shipped to another place where roasting and grinding into liquor are to be performed. For example, it may be desired to cure and dry in the tropics and to roast and grind in the United States. Should it be desired to delay curing as well as roasting, an intermediate drying step may be interposed between washing and curing whereby the beans are dried to a stable moisture content not greater than 8% for storage or shipment. The beans may later be remoistened to effect curing.

The above sequence of steps may be supplemented by cracking or puncturing the envelopes surrounding the kernels prior to drying so as to facilitate and expedite the drying operation. Such cracking may be performed either before or after curing. In the former case, however, any acid substances remaining after washing will tend to be distributed through the kernels during curing and hence it may be desirable to adjust the pH of the beans upwardly as set forth hereinafter.

Removal and separation of the shells, like washing, avoids contamination of the kernels with acid substances during curing. Moreover, in this case both curing and drying are performed on the kernels only, a procedure which affords the maximum advantage from the standpoint of expediting the curing and drying operations. The shells may be removed in any suitable way. Conveniently the beans as removed from the pods are first washed and then partially dried to about 20–25% moisture. The shells may be cracked either before or after such partial drying, and the cracked shells can be removed from the partially dried kernels by winnowing or fanning. After curing and drying, roasting may be performed promptly or delayed as explained above in connection with whole beans. Should it be desired to delay curing as well as roasting, the drying operation which precedes curing should be extended beyond the partially dried stage to a point (about 8% or less moisture) at which the kernels are stable while held in storage or while being shipped. The dry kernels then require remoistening prior to curing.

If desired, the pH of the beans or kernels can be adjusted upwardly during curing by treatment with a suitable alkali. Such upward adjustment of pH may cause some darkening of the liquor obtained from the roasted kernels, but there is no objectionable change in color and a somewhat milder flavor is produced. On the other hand, the addition of alkali materially expedites curing. A wide variety of alkaline materials can be used for this purpose, such as $Na_2CO_3$, $NaHCO_3$, $KHCO_3$, $NaOH$, $KOH$, $Mg(OH)_2$, $MgCO_3$, etc. The amount of alkali to be used will depend on the initial pH of the beans or kernels and on the amount of elevation of pH that is desired, the pH values being determined in the manner previously described. Government standards permit the addition of as much as 3 lbs. of $K_2CO_3$ to 100 lbs. of beans, or the neutralizing equivalent in the case of other alkaline materials. In most cases it will be sufficient to add about 1.5% $K_2CO_3$, or the neutralizing equivalent thereof, to the wet material prior to curing.

Thus the procedure followed preparatory to curing may differ substantially under varying conditions. From the standpoint of their effect on time of curing, these preparatory procedures may be classified under two general heads:

(A) Those which result in curing whole beans.
(B) Those which result in curing the kernels only.

These two groups differ substantially with respect to the limitation of the time of curing to avoid the effects of overcuring mentioned above. When the shells or skins are removed before curing (group B), the curing reactions are substantially expedited because of the absence of pulp acidity and because the kernels alone are more easily and thoroughly aerated. Accordingly the desired curing effects are accomplished more quickly, while there is less time for undesired enzymic reactions and development of acid precursors to take place.

Curing time is also influenced to some extent by the curing temperature employed and by the variety of the beans as well as by the degree of ripeness or maturity of the beans. Beans of white varieties, for example, usually cure somewhat more rapidly than beans of purple varieties. The effect of ripeness is more marked, unripe beans curing more slowly than ripe beans. However, the crop from most plantations comprises a mixture of different varieties of beans, and although there may be considerable variations in the degree of ripeness of individual pods gathered in one picking, experience has shown that in practice the factors of variety and ripeness tend to average in each lot and that the average does not vary greatly from lot to lot. Accordingly the optimum curing time for such average lots of beans does not vary greatly.

In the case of curing a lot of whole beans (group A) in which green beans predominate, the beans may first be held at the low temperature end of the curing temperature range (50° C.) to promote ripening as stated above. Thereafter completion of curing may be expedited by increasing the temperature, but if this is not desirable, curing at 50° C. may be extended to a maximum of about 50 hours. Beyond this point undesirable enzymic reactions become excessive, and fermentation due to thermophilic bacteria is apt to develop unduly. Also the development of acid precursors proceeds so far that the eventual liquor is objectionably acid. Although the beans may appear undercured at the end of this period when judged by the standards applicable to fermented beans, nevertheless the liquor obtained by roasting and grinding them has mild astringency and good chocolate aroma and flavor.

With an average lot of beans, and with curing temperatures of 55–60° C., the optimum stage of curing will be reached in the neighborhood of 24 hours. Although the beans still appear undercured when judged by standards applicable to fermented beans, the chocolate flavor and aroma and the color of the liquor will be excellent and astringency is practically completely eliminated. Longer curing results in deterioration of flavor and aroma of the liquor, an undesirable darkening in color, and a tendency toward acidity which increases as curing time is prolonged.

With a lot in which ripe beans predominate, the optimum stage of curing may be reached in as little as about 15 hours, assuming a good moisture content of 20–25% or more and especially when the pH of the beans is adjusted by the addition of alkali as described above. At still shorter times curing of the beans will be less than optimum, but nevertheless results in liquors useful for many purposes although not of as good quality as those made from beans cured under optimum conditions.

In the case of curing the kernels only (group B), the curing time for best results is substantially less than for whole beans (group A), the optimum for an average lot of kernels at 55–60° C. being about 16 hours. Even in the case of kernels from green beans cured at low temperatures (50° C.), it will usually be undesirable to continue the curing treatment much beyond 30–35 hours. On the other hand, in the case of well moistened kernels from fully ripe beans cured at higher temperatures, curing periods as short as 5–8 hours will produce acceptable results, especially when the pH of the kernels is adjusted upwardly as mentioned above.

As described more fully hereinafter, handling of washed dried beans tends to produce a mass of broken beans including detached particles of shell and kernels in both segmented and intact form with or without adhering shell. The conditions of temperature and time for curing such broken beans lie intermediate those applicable to whole beans (group A) and those applicable to kernels only (group B), depending on the degree of breakage. With a high degree of breakage, and when the pH of the broken beans is adjusted as mentioned above, the proper curing conditions will approach closely to those applicable to kernels only.

If desired, the raw cacao can also be treated prior to curing in any suitable manner to extract alkaloids, fat, etc., and curing applied to the resulting modified raw cacao. The fat can be removed by pressing, solvent extraction, or other known methods, to any desired extent up to removal of substantially the entire fat content (approximately 50% by weight). It has been observed that the raw cacao cures very rapidly when defatted and cured in the presence of alkali and at a high moisture level of the order of 35–

40% as illustrated by one of the following examples.

Curing may be performed in any suitable apparatus in which the prescribed heating conditions can be maintained with some aeration. A simple rotary drum supplied with heated air at the desired temperature gives good results. To avoid any danger of drying the kernels below the minimum moisture level of 12-15% mentioned above, heat may be supplied by suitably humidified air, or the curing apparatus may be heated externally in any suitable way.

Drying should be performed promptly and rapidly after curing in order to avoid possible overcuring or development of molds which might cause musty flavors. For example, a forced draft drier with air inlet temperature of 65° C. and air velocity through the beans of 125 feet per minute will dry whole beans in 8 to 9 hours. However, the evaporation of moisture from within the beans lowers their temperature with respect to the circulating air and some curing effects and mold growth may occur. Hence still better results are secured by higher air temperatures and velocities and shorter drying times. Air inlet temperatures above 110° C. may cause scorching, and moreover the temperature of the dry beans near the end of drying should not be above 100° C. to avoid roasting effects. Within these limits, drying may be completed with excellent results in 3-4 hours with an air inlet temperature of about 90-95° C. at the start of drying and 80-85° C. at the end of drying and an air velocity through the beans of about 170 feet per minute. However, it may be necessary to keep the humidity of the air high at the start to avoid case hardening effects.

It should be borne in mind that the drying times mentioned above apply to whole, uncracked beans. Cracking before drying substantially expedites the drying operation as stated above, and where the beans are partially dried and their shells removed before curing, the final drying of the kernels after curing can be effected in a much shorter time.

Roasting may be performed in any desired manner and in any suitable apparatus. Bean temperatures should not exceed about 140° C. to avoid scorched flavors. The roasted beans may then be ground into liquor and processed in any desired way according to known techniques and procedures.

The cured and dried but unroasted product obtained by the above procedures constitutes a novel and valuable product per se, in view of the fact that it can be produced in tropical growing areas and then stored, sold and shipped to the United States or elsewhere for roasting and final processing into chocolate liquor. When this product is prepared by washing, curing and drying the beans without removing the shells, it contains not more than 4-10% of shell, and this is in the form of a thin loose skin easily separable from the kernels and radically different from the relatively thick, hard, unloosened and intact shells of dried fermented beans and especially of sun-dried beans. Bagging of this product and handling during storage and shipment cause a large part of the thin, fragile shell to be detached from the kernels in the form of a chaff. Also the kernels, with or without some adhering shell, separate into their naturally occurring segments to a large extent although many kernels may remain intact. Such a mixture constitutes the "broken beans" mentioned above. When the shells or skins are separated from the kernels before curing, on the other hand, the product of the present invention comprises no shell at all except for small bits that may be left due to incomplete removal or separation.

Such products are further differentiated from the usual dried fermented beans in that the kernels appear to have undergone insufficient processing when judged by the usual standards applied to fermented beans. In many cases residual traces of the original color of the raw beans will be found after curing which heretofore has been considered an indication of poor quality. Nevertheless we have found that such apparently insufficiently cured cacao develops excellent chocolate flavor and aroma when roasted and ground into liquor, in contrast to the poor and unsatisfactory quality of liquors obtained by the prior experimental procedures mentioned above. Moreover, any purple color remaining in fermented cacao generally persists through roasting, due probably to the relatively high acid conditions of roasting, and produces a very undesirable cast in the chocolate liquor. In the case of cacao cured by the present invention, however, such residual casts in the cured cacao are thermolabile so that they disappear during roasting and do not show up in the liquor.

The cured and dried cacao produced by the present invention is further differentiated from fermented cacao by very low bacterial counts, and especially by a very low content of volatile acids (fermentation acids) and very low astringency. In fermentation processes, astringency decreases as fermentation proceeds but as explained above a characteristic sourness develops due to a concomitant increase of volatile acidity. Sun-dried cacaos are usually high both in astringency and volatile acidity, although the latter does not develop quite as much as in fermentation procedures. In contrast, cacao cured by the present invention is as low or lower in astringency than the best fermented cacaos and is far lower in volatile acidity than either fermented or sun-dried cacaos. Thus the chocolate liquor produced from this cacao is exceptionally low in both astringency and volatile acidity and the need for conching the liquor is greatly reduced. Furthermore the product is remarkably uniform in these respects as well as in the degree of curing so that variations in roasting treatment of individual lots of beans, heretofore determined by trial and error in each case, are largely eliminated.

For purposes of comparison, the volatile acidities of various samples can be determined in the following manner. The shelled unroasted beans (kernels) or the roasted kernels (nibs) are ground and to 10 gm. of ground material are added 50 ml. water and 4.4 gm. anhydrous sodium sulfate, the mixture being acidified to pH 1.0 with 2 N p-toluene-sulphonic acid. This sample is then distilled under vacuum at about 30° C. while maintaining a constant volume of about 50 ml. by feeding water to the distilling flask at a constant rate until the total volume of distillate reaches 550 ml. The distillate is then titrated to a phenolphthalein end point with 0.1 N NaOH, and a blank titration on an equal volume of water treated in the same manner is subtracted from the distillate titration. The result can be expressed conveniently in terms of per cent acetic acid by weight of the kernels. This procedure does not allow for variations in the moisture content of the kernels themselves, but the amount of such moisture is small and also fairly uniform so that such variations do not affect the results materially.

The volatile acidities of 19 different samples of commercial tropically treated cacaos (both sun-dried and fermented) as determined by this procedure averaged 0.25%, the minimum being 0.14% and the maximum 0.43%. In contrast the volatile acidities determined by the same procedure in 35 representative samples of cacao cured by the present invention ranged from a maximum value of only 0.042 down to 0.000, the average being 0.013. Thus the average volatile acidity resulting from procedures embodying the present invention is only about 1/20 of the average produced by tropical curing methods heretofore used. The volatile acidity should not exceed 0.05 in the absence of unusual conditions such as incipient fermentation that may sometimes occur in large scale production, in which case somewhat higher volatile acidities up to about 0.08% may be encountered. These values will, of course, increase proportionately as the fat content of the cacao is reduced, the maximum volatile acid content in the case of complete defatting being about 0.16%.

The following specific examples illustrate the results obtained by the application of processes embodying the invention to cacao beans from the various sources indicated. In each example whole pods from the respective sources were opened and the beans with their adherent pulp removed and subjected to the treatment outlined.

EXAMPLE 1

Beans from Almirante, Panama, ranging from light to deep purple in color, were washed and their pH determined to be 6.46. The washed beans were cured either in a horizontal revolving jar open to the atmosphere or in a closed rotary drum through which humidified air was passed continuously during treatment, the vessels being housed in cabinets maintained at curing temperatures. The air passed through the drum was also heated to curing temperature by prior passage through a coil disposed in the same cabinet.

Sample A was jar cured for 16 hours at 60° C.
Sample B was drum cured for 24 hours at 60° C.
Sample C was jar cured for 69 hours at 60° C.
Sample D was drum cured for 24 hours at 55° C.

The four cured samples were dried in a forced draft laboratory drier at an air inlet temperature of 65° C. and air velocity through the beans of approximately 100 linear feet per minute, the drying time for samples A, B, C, and D respectively being 15, 19, 15 and 19 hours. The average bacterial count of the dried samples was less than 100 per gram, and their pH and moisture values and shell content were as follows:

| Sample | Per Cent Moisture | pH | Per Cent Shell |
|---|---|---|---|
| A | 4.1 | 6.55 | 6.4 |
| B | 2.9 | 6.50 | 6.5 |
| C | 3.7 | 6.25 | 6.5 |
| D | 1.8 | 6.32 | 6.0 |

After roasting, the samples were shelled and ground into liquors which were scored as follows:

*Liquor A.*—Some astringency but no acidity, chocolate flavor and aroma acceptable but not as good as B, acceptable light chocolate brown.

*Liquor B.*—Very mild with respect to astringency and acidity, good chocolate flavor and aroma, acceptable light chocolate brown.

*Liquor C.*—Objectionably acid but minimum astringency, inferior chocolate flavor and aroma, darker in color than A, B or D.

*Liquor D.*—Slight astringency but no acidity, chocolate flavor and aroma not as good as B but better than A, slightly raw flavor, acceptable light chocolate brown.

Tropically fermented Panama beans from the same locality had a shell content of about 14%, a pH of about 5.5 to 6.0, and an average bacterial count of 428,000,000 per gram. Chocolate liquor made from these beans was rated hammy, acid, sour, astringent and darker than liquors A, B or D.

EXAMPLE 2

Beans from Port-au-Prince, Haiti, mostly purple but some white, were washed and divided into three portions that were processed as follows:

*Sample A.*—Beans drum cured for 24 hours at 60° C. and dried in a forced draft laboratory drier for 20 hours at an air inlet temperature of 65° C.

*Sample B.*—Beans similarly dried for 20 hours at an air inlet temperature of 60° C., shells cracked and separated from the kernels, 15% water added to the kernels which were cured for 24 hours at 60° C. and then dried by forced draft for 5 hours at an air inlet temperature of 65° C.

*Sample C.*—Same processing as for sample B except curing performed for 8 hours at 60° C.

In all samples, some purple was still present after curing, but largely disappeared on drying and was no longer detectable after roasting. Before and after drying, the flavor of all cured samples was of a chocolate character. Samples B and C were noted to have some aroma, whereas none was detected in sample A.

After roasting, the three samples were ground into liquors, which were scored as follows:

*Liquor A.*—Mild with respect to astringency and acidity, very good chocolate flavor and aroma, light chocolate brown.

*Liquor B.*—Mild with respect to astringency and acidity, chocolate flavor and aroma not as good as A, darker and redder than A.

*Liquor C.*—Mild with respect to acidity but slightly more astringent than B, chocolate flavor and aroma better than B but not as good as A, light chocolate brown.

Liquor A was further processed into a finished piece of sweet chocolate which was considered excellent eating. On the other hand, the liquors obtained from tropically processed Haiti cacao are known for their inferior quality. Finished chocolate from these liquors without conching and blending with others is highly unpleasant to the taste.

EXAMPLE 3

Beans from Mayaguez, Puerto Rico, ranging from light to dark purple, were washed and drum cured for 24 hours at 60° C. and dried in a forced draft laboratory drier for 20 hours at an air inlet temperature of 65° C. After curing, the beans were of a very light tan with some lavender centers which remained after drying but entirely disappeared after roasting. Before and after drying, the flavor of the cured beans was of a chocolate character.

After roasting, the beans were shelled and ground into liquor which was rated as follows:

Mild with respect to astringency and acidity, excellent chocolate flavor and aroma, reminiscent of Porto Cabello and good Venezuelan with a hint of Trinidad, excellent light chocolate brown.

EXAMPLE 4

Beans from San Francisco de Macoris, Dominican Republic (known as Sanchez from the port of shipment), mostly light to deep purple with some white, were washed and their pH determined to be 6.5. The washed beans were drum cured for 24 hours at 60° C. and dried in a forced draft laboratory drier for 20 hours at an air inlet temperature of 65° C. The bacterial count of the dried beans was less than 20 per gram, and the following data were determined:

pH _____ 6.47
Moisture content _____per cent__ 4.9
Shell content _____do____ 6.0

After roasting, the beans were ground into liquor which was rated mild with respect to astringency and acidity, good chocolate flavor, mild aroma, light chocolate brown color.

Tropically processed beans from the same locality had a shell content of about 11.8%, a pH of about 5.6, and an average bacterial count of 14,800 per gram. Chocolate liquor made from these beans was rated very astringent, bitter, raw, purplish and much darker than the liquor processed by the invention.

EXAMPLE 5

Beans from Ocumare de la Costa, Venezuela (known as Caracas from the port of shipment), the majority ranging from light to deep purple and the remainder from white to light pink, were washed and their pH determined to be 6.25. These washed beans were jar cured for 24 hours at 60° C. and dried in a forced draft laboratory drier for 15 hours at an air inlet temperature of 65° C. The bacterial count of the dried beans was less than 100 per gram, and the following data were determined:

pH _____ 6.33
Moisture content _____per cent__ 4.2
Shell content _____ 6.9

After roasting, the beans were ground into liquor which was rated mild with respect to astringency and acidity, superior chocolate flavor and aroma, very light yellow chocolate brown color.

Tropically fermented Venezuelan beans from the same locality had a shell content of about 11.8%, a pH of about 4.7, and an average bacterial count of 13,370,000 per gram. Chocolate liquor made from these beans was considered very acid, off-colored and much darker than the liquor processed by the invention.

EXAMPLE 6

Beans from Ecuador (known as Arriba), ranging from light to deep purple, were washed and their pH determined to be 6.7. These washed beans were jar cured for 24 hours at 55° C. and dried in a forced draft laboratory drier for 18 hours at an air inlet temperature of 65° C. The following data were then determined:

pH _____ 6.45
Moisture content _____per cent__ 4.8
Shell content _____do____ 7.0

After roasting, the beans were ground into liquor which was rated very mild with respect to astringency and acidity, excellent Arriba flavor, good aroma, light chocolate color.

A finished piece of chocolate prepared from this liquor was considered better eating than a finished piece prepared from tropically treated Arriba beans.

EXAMPLE 7

The following distinct botanical varieties of cacao were specially selected from the groves of the Imperial College of Tropical Agriculture, St. Augustine, Trinidad;

*Amazonian Forastero.*—Light purple beans.

*Central American Criollo.*—White beans. Some of the pods contained light purple beans by cross pollination and these were processed separately from the white beans from the other pods. The purple beans were of a somewhat darker shade than the Forastero beans.

*Trinidad.*—Light purple beans though darker than either the Forastero or the purple Criollo beans.

All four samples were washed, jar cured for 24 hours at 60° C., dried in a forced draft laboratory drier for 17 to 18 hours at an air inlet temperature of 65° C., and roasted and ground into liquor.

The pH values at various stages during processing were:

|  | Forastero | White Criollo | Purple Criollo | Trinidad |
|---|---|---|---|---|
| Raw beans | 5.70 | 5.35 | 5.50 | 5.00 |
| Washed beans |  | 6.20 | 6.20 | 6.50 |
| Cured beans | 6.40 | 6.00 | 6.02 | 6.25 |
| Dried beans | 6.23 | 6.14 | 6.27 | 6.28 |

*Amazonian Forastero*

The color of the liquor was a very light brown with an acceptable orange cast and was extremely light for a Forastero cacao. The flavor was rated excellent and devoid of both acidity and astringency. The liquor was very high in aroma.

*Central American Criollo (white)*

The same orange cast was present in this Criollo liquor which was the lightest ever experienced by persons well versed in the art of chocolate manufacture. The flavor was rated excellent with little if any acidity, although there was a noticeable astringency due to the beans being immature. The aroma was very high.

*Central American Criollo (purple)*

The color was light brown with no orange cast. The flavor was rated excellent with little if any acidity and only slight astringency. The aroma was very high.

*Trinidad*

The color was very light brown with no orange cast. The flavor was rated excellent with little if any acidity and only slight astringency. The aroma was very high.

EXAMPLE 8

Beans from Maracaibo, Venezuela, ranging from white to very light pink, were washed and their pH determined to be 6.47. These beans were drum cured for 24 hours at 55° C. and dried in a forced draft laboratory drier for 17 hours at an air inlet temperature of 65° C. The following data were then determined:

pH _____ 6.23
Moisture content _____per cent__ 4.7
Shell content _____do____ 7.5

Tropically fermented Maracaibo beans, after drying, have a shell content of about 10% and a pH of about 5.1.

After roasting the beans were ground into liquor which was rated light brown with orange cast, typical Maracaibo flavor but free of acidity and astringency, very good aroma.

EXAMPLE 9

Beans from Almirante, Panama (see Example 1), were washed and divided into two portions which were cured as follows:

Sample A.—Drum cured for 24 hours at 55° C.
Sample B.—Drum cured first for 3 hours at 60° C. and thereafter for 21 hours at 50° C.

Each sample was dried for 17 to 18 hours in a forced draft laboratory drier at an air inlet temperature of 65° C. After roasting, liquors were produced and scored in the usual manner.

Liquor B was considered superior to liquor A especially in aromatic quality.

EXAMPLE 10

Washed, dried Panama beans were shelled and the kernels ground in a corn mill to the size of cornmeal. One hundred grams (dry basis) of this material were defatted by repeated extractions with petroleum ether until analysis showed removal of more than 98% of the total fat. The defatted material was thoroughly mixed with a solution of 1.3 gm. potassium carbonate in 30 cc. of water and cured at 60° C. for five hours, the moisture being maintained at a constant level. The cured, defatted cacao was then dried, roasted and ground into liquor which had a red-brown color and good cholocate flavor.

The following Examples 11–13 comprise pilot plant runs conducted on Panama beans at Almirante, Panama, except that Example 13 was performed partly in the United States. In thirteen runs in accordance with Examples 11 and 12, the cured, dried beans were shipped from Panama to the United States according to normal commercial practice and on arrival were found to have an average bacterial count of 3,000 per gram as compared with an average count of 428,000,000 per gram for fermented Panama beans shipped in the same manner.

The details of Examples 11–13 were as follows:

EXAMPLE 11

Beans freshly removed from whole pods, color pink to medium purple, were washed and cured for 20 hours in a pilot plant apparatus comprising a rotary drum housed in a water-jacketed chamber, the temperature in the jacket being sufficient to maintain the beans at 60° C. A fan was operated inside the chamber for better heat distribution, and air was allowed to breathe in and out of the chamber. At the end of curing, the color of the cut beans ranged from light to medium purple.

Drying was carried out at an air inlet temperature of about 93° C. (200 F.) at the start and about 82 C. (180° F.) at the end of drying and air velocity through the beans of approximately 170 feet per minute. To prevent case hardening, the humidity of the air was initially kept high and thereafter, as the tendency for case hardening decreased, it was progressively lowered for rapid drying of the beans. Under these conditions, the beans were dried in 4.5 hours. The following data were obtained from the dried beans:

| | |
|---|---|
| Moisture content_____per cent__ | 5.9 |
| Shell content_____do____ | 8.7 |
| pH of whole beans_____ | 6.38 |
| pH of shells_____ | 5.88 |
| pH of kernels_____ | 6.68 |
| Volatile acids in kernels calculated as acetic acid_____per cent__ | 0.36 |

A roasted sample was ground into liquor which was a good reddish brown in color, aromatic, slightly astringent, and of good chocolate flavor.

EXAMPLE 12

Beans freshly removed from whole pods, color light to dark purple, were washed and their pH determined to be 6.14. The washed beans were passed through cracking rolls set so as to merely puncture their shells and divided into two portions one of which was processed according to the following Example 13.

The other portion was cured as in Example 11 except that the curing period was limited to 8 hours. Drying was carried out in 3 hours at an air inlet temperature of about 82° C. (180° F.) and air velocity through the beans of 146 feet per minute. The following data were obtained from the dried beans:

| | |
|---|---|
| Moisture content_____per cent__ | 5.2 |
| pH of whole beans_____ | 6.15 |
| pH of shells_____ | 5.46 |
| pH of kernels_____ | 6.39 |

A representative sample was roasted and ground into liquor which had a good chocolate brown color, slight bitterness, and good chocolate flavor.

EXAMPLE 13

Following the partial cracking operation of Example 12, a portion of the beans was dried in about 4 hours at an air inlet temperature for the first hour of about 82° C. (180° F.) and for the last three hours of about 65° C. (150° F.) and air velocity throughout the 4-hour drying period of 146 feet per minute. The following values were obtained from the dried beans:

| | |
|---|---|
| Moisture content_____per cent__ | 5.7 |
| pH of kernels_____ | 6.5 |
| Volatile acids in kernels calculated as acetic acid_____per cent__ | 0.004 |

The dried uncured beans were shipped to a factory in the United States where they were shelled and divided into two portions which were treated as follows:

Sample A was treated with 15% pure water by weight.

Sample B was treated with an alkaline solution such that 15% water and 1.5% potassium carbonate by weight were added to the sample.

The two samples absorbed the treating liquids in about 15 minutes and were thereafter cured for 24 hours at 60° C., being stirred at intervals to insure proper aeration. To guard against undue loss of moisture by evaporation, an additional 25% water by weight of the samples was added during the first three hours of curing. However, little moisture was lost by evaporation, and the final moisture content of the samples was approximately 40%.

After curing, portions of both samples were dried in a forced draft laboratory drier for 2 hours at an air inlet temperature of 65° C. and analyzed for acid content with the following results:

|  | A | B |
|---|---|---|
| pH of kernels | 6.3 | 7.0 |
| Volatile acids in kernels calculated as acetic acid, per cent | 0.06 | ---- |

The remaining portions of both samples were dried and roasted simultaneously in a forced draft laboratory roaster previously heated to an air temperature of 140° C. (285° F.). The total period of heating in the roaster was 25 minutes during the last 15 minutes of which the temperature of the nibs increased from about 121° C. (250° F.) to about 138° C. (280° F.). The roasted nibs were then ground into liquors scored as follows:

*Liquor A.*—Very little astringency, good chocolate flavor, slight bitterness, good aroma, light chocolate brown with a yellowish cast.

*Liquor B.*—Very little astringency, good chocolate flavor, no bitterness, good aroma, rich chocolate brown with an intense reddish cast.

An uncured portion of the same beans was directly roasted and ground and the product rated very astringent, green, bitter and harsh, malty, and purple colored.

The following Examples 14–17 further illustrate the reduction in acidity of chocolate liquors made from cacao processed according to the present invention as compared with liquors made from cacao treated by the usual tropical methods. In these examples the beans were cured as indicated and then dried under forced draft with an air inlet temperature of 65° C. The dried beans, with or without roasting as indicated in the examples, were then shelled, ground and admixed with ten times their weight of boiling water and allowed to cool. The pH values of the cooled suspensions were then determined, and they were also titrated to a pH of 7.5 and their titratable acidity expressed as ccs. of 0.1 N NaOH per 10 grams of ground beans in suspension.

These examples indicate the extent to which the acid content of chocolate liquor can be reduced by the present invention. Also they show the effects on liquor acidity of varying the curing time within the limits of the present invention. As previously stated, it will be evident from the data of these examples that the pH values of the liquors are not a true measure of their acid nature as titrated or tasted, from which it appears that some of the substances responsible for acidity are characterized by a low degree of dissociation. Buffering substances may also be present to account for part of the observed discrepancy between pH and titration values. Considering the titration values, the formation of acid precursors is shown by the consistent and substantial increases in titratable acidity under optimum roast conditions. The development of these precursors is little affected by variations in the curing temperature within the limits of the invention, being if anything somewhat more rapid in the lower part of the temperature range. On the other hand, the examples show that the amount of such precursors formed increases with curing time. With curing periods such as 72 hrs. (Example 15) and 69 hrs. (Example 16) the titrable acidity of the liquor becomes excessive, being equivalent to or even higher than the titrable acidity of the liquor made from the corresponding tropically fermented cacao.

EXAMPLE 14

*Maracaibo beans*

|  | pH | Titratable Acidity |
|---|---|---|
| Cured 16 hrs. at 55° C.: |  |  |
| No roast | 6.63 | 5.00 |
| Short roast | 6.57 | 5.50 |
| Optimum roast | 6.14 | 9.00 |
| Cured 20 hrs. at 55° C.: Optimum roast | 6.11 | 9.30 |
| Cured 24 hrs. at 55° C.: |  |  |
| No roast | 6.14 | 8.33 |
| Short roast | 6.20 | 9.00 |
| Optimum roast | 5.86 | 11.50 |
| Long roast | 5.62 | 10.50 |
| Fermented Maracaibo: |  |  |
| No roast | 5.48 | 17.63 |
| Short roast | 5.62 | 14.20 |
| Optimum roast | 5.62 | 13.75 |
| Long roast | 5.51 | 13.66 |

EXAMPLE 15

*Ecuador beans*

|  | pH | Titratable Acidity |
|---|---|---|
| Cured 16 hrs. at 50° C.: |  |  |
| Short roast | 6.47 | 5.52 |
| Optimum roast | 6.17 | 8.40 |
| Cured 20 hrs. at 50° C.: |  |  |
| Short roast | 6.40 | 6.25 |
| Optimum roast | 5.93 | 13.70 |
| Cured 72 hrs. at 50° C.: |  |  |
| Short roast | 5.61 | 13.25 |
| Optimum roast | 5.17 | 20.50 |
| Cured 24 hrs. at 60° C.: |  |  |
| Short roast | 6.27 | 7.00 |
| Optimum roast | 5.80 | 10.80 |
| Fermented Arriba: Optimum roast | 5.98 | 10.20 |

EXAMPLE 16

*Panama beans*

|  | pH | Titratable Acidity |
|---|---|---|
| No curing: |  |  |
| No roast | 6.43 | 5.6 |
| Optimum roast | 6.08 | 8.9 |
| Cured 24 hrs. at 55° C.: |  |  |
| No roast | 6.19 | 7.5 |
| Optimum roast | 5.50 | 13.0 |
| Cured 16 hrs. at 60° C.: |  |  |
| No roast | 6.38 | 5.8 |
| Optimum roast | 5.61 | 9.5 |
| Cured 24 hrs. at 60° C.: |  |  |
| No roast | 6.37 | 6.2 |
| Optimum roast | 5.83 | 10.0 |
| Cured 69 hrs. at 60° C.: |  |  |
| No roast | 6.27 | 7.5 |
| Optimum roast | 5.78 | 16.1 |
| Fermented Panama: |  |  |
| No roast | 5.39 | 15.21 |
| Optimum roast | 5.10 | 16.20 |

EXAMPLE 17

*Caracas beans*

|  | pH | Titratable Acidity |
|---|---|---|
| Cured 24 hrs. at 60° C.: Optimum roast | 6.12 | 7.7 |
| Cured 41 hrs. at 60° C.: Optimum roast | 5.92 | 10.3 |
| Fermented Caracas: Optimum roast | 4.98 | 23.3 |

It will be seen that the invention produces quality liquors from all types of cacao. These liquors are very low in acidity as compared with the best liquors heretofore obtainable, and type for type are better in color, flavor and aroma. The need for conching is reduced to a minimum, and the complications of prior blending practice are simplified. The liquors in general are exceptionally light in color for the type of cacao processed which is very desirable. Also the cacao is very low in bacterial and mold contamination so that losses in storage and shipment as well as off-flavors due to molding are avoided while current difficulties with regard to the use of the chocolate in dairy products and the like are markedly reduced. These desirable and valuable effects are obtained by a simple economical procedure which produces uniform results in a shorter time and with greater efficiency than the fermentation methods heretofore used in the tropics.

It will be understood that the invention is not restricted to the details set forth above and that reference should be had to the appended claims for a definition of its limits. Thus the non-fermentative curing of the invention can be applied to whole beans as removed from the pod but separated from the greater part of their mucilaginous material, whether undried, partially dried, or dried and remoistened; to their kernels only in intact or segmented form; to mixtures of such whole beans with such kernels; or to mixtures of such whole beans with such kernels and detached shell as in the case of broken beans mentioned above. Furthermore such curing can be applied to any or all of these materials in modified form as for instance after extraction of fat, alkaloids, etc. The term "raw cacao" as used in the appended claims is generic to and designates any or all of these starting materials, and the term "cacao" designates the product resulting from curing and drying such raw cacao.

What is claimed is:

1. A process for the non-fermentative curing of raw cacao which comprises maintaining the cacao at a temperature between 50° C. and 65° C. and with a moisture content not less than 12–15% for a period between 5 and 50 hours, and then arresting the curing by rapidly drying the resulting product.

2. A process as defined in claim 1 wherein the resulting product is dried by passing heated air therethrough, the temperature and rate of circulation of the air being regulated so that the temperature of the product does not exceed about 100° C. throughout drying.

3. A process as defined in claim 1 wherein the raw cacao is cured in the form of broken beans consisting of kernels with particles of attached shell and detached particles of shell mixed therewith.

4. A process for the non-fermentative curing of raw cacao in the form of whole beans which comprises maintaining the beans at a temperature between 50° C. and 65° C. and with a moisture content not less than about 12–15% for a period between 15 and 50 hours, and then arresting the curing by rapidly drying the beans.

5. A process as defined in claim 4 wherein the beans are dried by passing heated air therethrough, the temperature and rate of circulation of the air being regulated so that the temperature of the beans does not exceed about 100° C. throughout drying.

6. A process as defined in claim 4 wherein the beans are cracked prior to drying.

7. A process as defined in claim 4 wherein the beans are treated with alkali to increase their pH during curing.

8. A process for the non-fermentative curing of raw cacao in the form of kernels which comprises maintaining the kernels at a temperature between 50° C. and 65° C. and with a moisture content not less than about 12–15% for a period between 5 and 35 hours and then arresting the curing by rapidly drying the resulting product.

9. A process as defined in claim 8 wherein the resulting product is dried by passing heated air therethrough, the temperature and rate of circulation of the air being regulated so that the temperature of the product does not exceed about 100° C. throughout drying.

10. A process as defined in claim 8 wherein the kernels are treated with alkali to increase their pH during curing.

11. A process as defined in claim 8 applied to kernels from which at least a substantial part of the fat has been removed.

12. The method of treating the seeds of *Theobroma cacao* which comprises washing the seeds to remove at least the greater part of their mucilaginous material, then subjecting the raw cacao in the form of whole beans to non-fermentative curing by maintaining the beans at a temperature between 50° C. and 65° C. and with a moisture content not less than about 12–15% for a period between 15 and 50 hours, and then arresting the curing by rapidly drying the cured beans.

13. The method defined in claim 12 wherein the beans are dried by passing heated air therethrough, the temperature and rate of circulation of the air being regulated so that the temperature of the beans does not exceed about 100° C. throughout drying.

14. The method defined in claim 12 wherein the beans are cracked before drying.

15. The method defined in claim 12 wherein the washed beans are dried to a moisture content not greater than about 8% and are then remoistened to a minimum moisture content not less than 12–15% before curing.

16. The method defined in claim 12 wherein the beans are treated with alkali to increase their pH during curing.

17. The method of treating the seeds of *Theobroma cacao* which comprises washing the seeds to remove at least the greater part of their mucilaginous material, at least partially drying the seeds and then removing their shells, subjecting the remaining kernels to non-fermentative curing by maintaining them at a temperature between 50° C. and 65° C. and with a moisture content not less than about 12–15% for a period between 5 and 35 hours, and then arresting the curing by rapidly drying the kernels.

18. The method defined in claim 17 wherein the kernels are dried rapidly by passing heated air therethrough, the temperature and rate of circulation of the air being regulated so that the temperature of the kernels does not exceed about 100° C. throughout drying.

19. The method defined in claim 17 wherein the kernels are treated with alkali to increase their pH during curing.

20. The method defined in claim 17 wherein the seeds are partially dried to a moisture content of about 20–25% for removal of the shells.

21. The method defined in claim 17 wherein the kernels are dried to a maximum moisture content of about 8% before curing and then are remoistened to increase their moisture content to a minimum of about 12–15% during curing.

22. The method defined in claim 17 wherein at least a substantial portion of the fat content of the kernels is removed before curing.

23. Dry cured unroasted cacao substantially devoid of astringency and containing not more than 0.08% by weight of volatile acids when calculated as acetic acid, said cacao consisting essentially of kernels and thin fragile loose shells substantially devoid of dried mucilaginous matter and amounting to not more than 4-10% by weight of the cacao, said cacao having been cured by the process of claim 1 and being characterized by the presence of a thermolabile purplish cast.

24. Dry cured unroasted cacao substantially devoid of astringency and containing not more than 0.08% by weight of volatile acids when calculated as acetic acid and substantially free of shell, said cacao having been cured by the process of claim 1 and being characterized by the presence of a thermolabile purplish cast.

NORMAN W. KEMPF.
HARVEY K. MURER.

REFERENCES CITED

The following references are of record in the file of this patent:

UNITED STATES PATENTS

| Number | Name | Date |
|---|---|---|
| 571,238 | Pieper | Nov. 10, 1896 |
| 998,113 | Neumann | July 18, 1911 |
| 1,032,931 | Neumann | July 16, 1912 |

FOREIGN PATENTS

| Number | Country | Date |
|---|---|---|
| 317,335 | Great Britain | of 1929 |

OTHER REFERENCES

Chemistry Flavoring and Mfg. of Cocoa, by Jensen, 1931, pp. 5 to 11.